(12) United States Patent
Yamane et al.

(10) Patent No.: US 9,122,980 B2
(45) Date of Patent: Sep. 1, 2015

(54) INFORMATION PROCESSING DEVICE AND METHOD EXTRACTING A CONTOUR FROM IMAGE OF COMBINED PIXEL DATA OBJECT AND VECTOR DATA OBJECT

(71) Applicants: Youhei Yamane, Tokyo (JP); Masahide Horiuchi, Tokyo (JP); Fumiko Tsuwano, Tokyo (JP); Hiroki Yamamoto, Tokyo (JP)

(72) Inventors: Youhei Yamane, Tokyo (JP); Masahide Horiuchi, Tokyo (JP); Fumiko Tsuwano, Tokyo (JP); Hiroki Yamamoto, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/529,528

(22) Filed: Oct. 31, 2014

(65) Prior Publication Data

US 2015/0124295 A1    May 7, 2015

(30) Foreign Application Priority Data

Nov. 7, 2013  (JP) ................................. 2013-231492

(51) Int. Cl.
*G06K 15/00* (2006.01)
*G06K 15/02* (2006.01)
*G06K 9/48* (2006.01)

(52) U.S. Cl.
CPC ................ *G06K 15/188* (2013.01); *G06K 9/48* (2013.01); *G06K 15/1868* (2013.01); *G06K 15/1871* (2013.01); *G06K 15/1889* (2013.01); *G06K 15/407* (2013.01)

(58) Field of Classification Search
None
See application file for complete search history.

(56) References Cited

U.S. PATENT DOCUMENTS

2007/0121160 A1* 5/2007 Markovic ..................... 358/1.18
2011/0235080 A1* 9/2011 Satou et al. .................. 358/1.13

FOREIGN PATENT DOCUMENTS

| JP | 08-077336 | 3/1996 |
| JP | 2005-324425 | 11/2005 |
| JP | 2013-196308 | 9/2013 |

* cited by examiner

*Primary Examiner* — Scott A Rogers
(74) *Attorney, Agent, or Firm* — Oblon, McClelland, Maier & Neustadt, L.L.P.

(57) ABSTRACT

An information processing device includes an identifying unit, a generation unit, and a contour extraction unit. The identifying unit identifies a first object expressed by pixel data and a second object expressed by vector data from target image data including drawing information for each object. The generation unit performs rasterization based on first drawing information indicating the drawing information of the first object and second drawing information indicating the drawing information of the second object to generate combined image data, into which the first object and the second object are combined. The contour extraction unit extracts a contour from the combined image data.

12 Claims, 16 Drawing Sheets

COLOR PLANE IMAGE DATA

| TYPE OF GLOSS EFFECT | GLOSS | DEVIATION |
|---|---|---|
| SPECULAR GLOSS (PG) | $Gs \geq 80$ | $\Delta Gs \leq 10$ |
| SOLID GLOSS (G) | $Gs = Gs$ (SOLID GLOSS) | $\Delta Gs \leq 10$ |
| HALFTONE-DOT MATT (M) | $Gs = Gs$ (1C 30% HALFTONE-DOT) | $\Delta Gs \leq 10$ |
| MATTING (PM) | $Gs \leq 10$ | $\Delta Gs \leq 10$ |

INFORMATION PROCESSING DEVICE AND METHOD EXTRACTING A CONTOUR FROM IMAGE OF COMBINED PIXEL DATA OBJECT AND VECTOR DATA OBJECT

CROSS-REFERENCE TO RELATED APPLICATIONS

The present application claims priority to and incorporates by reference the entire contents of Japanese Patent Application No. 2013-231492 filed in Japan on Nov. 7, 2013.

BACKGROUND OF THE INVENTION

1. Field of the Invention

The present invention relates to an information processing device and a method of processing information.

2. Description of the Related Art

In recent years, technologies of performing printing with a special color ink such as a clear toner have been increasing. In the printing with a special color ink, an object (hereinafter, a special color object) to be printed with the special color ink is arranged on an existing object on an original copy. This enables the printing with the special color ink.

To create the special color object, it is necessary to accurately extract a contour from a target object on the original copy. Conventionally, various technologies are known as a method of extracting a desired area from a color image or a continuous tone image (image).

For example, Japanese Laid-open Patent Publication No. 8-077336 discloses a configuration of instructing and inputting an outer frame area to include a contour portion in an original image, obtaining differences between pixels of the original image in the outer frame area and adjacent pixels, in a color space, and linking pixels that indicate maximum differences to form a contour line, in order to reduce an input load of an operator when performing image clipping and to enable fast and accurate extraction of a target area.

However, conventionally, there is no mechanism to extract a contour from an image in which an object expressed by pixel data and an object expressed by vector data are mixed.

Therefore, there is a need for an information processing device and a method of processing information capable of extracting a contour from an image in which an object expressed by pixel data and an object expressed by vector data are mixed.

SUMMARY OF THE INVENTION

It is an object of the present invention to at least partially solve the problems in the conventional technology.

The present invention provides an information processing device that includes an identifying unit configured to identify a first object expressed by pixel data and a second object expressed by vector data from target image data including drawing information for each object; a generation unit configured to perform rasterization based on first drawing information indicating the drawing information of the first object and second drawing information indicating the drawing information of the second object to generate combined image data, into which the first object and the second object are combined; and a contour extraction unit configured to extract a contour from the combined image data.

The present invention also provides an image processing device that includes an identifying unit configured to identify a first object expressed by pixel data and a second object expressed by vector data from target image data including drawing information for each object; a generation unit configured to perform rasterization based on first drawing information indicating the drawing information of the first object to generate contour extraction image data; and a contour extraction unit configured to extract a contour from the contour extraction image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an information processing device and a method of processing information according to the present invention will be described in detail with reference to the appended drawings.

First Embodiment

First, a configuration of an image forming system of the present embodiment will be described with reference to FIG. 1.

Figure 1:
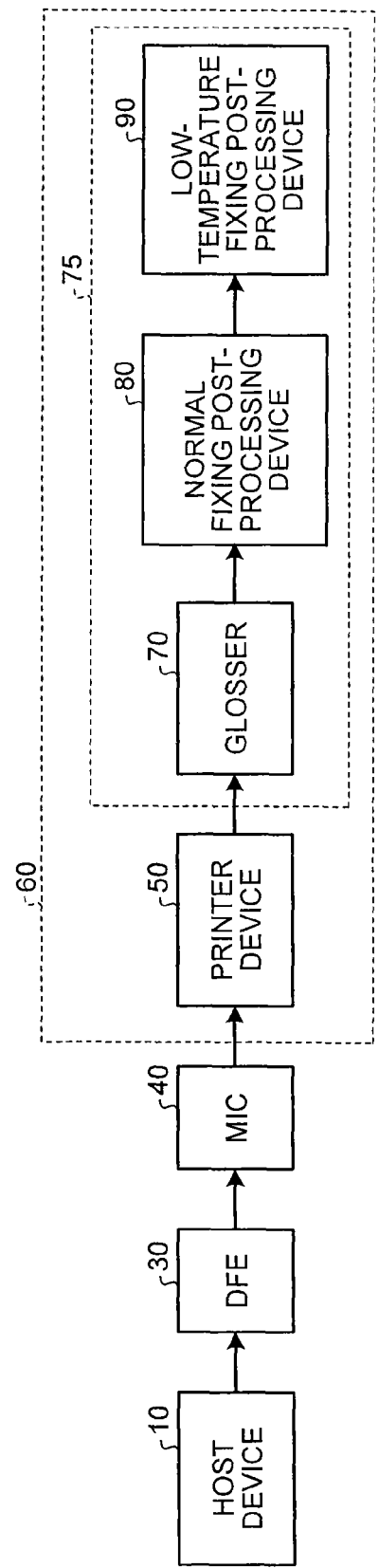
FIG. 1 is a diagram illustrating an example of a configuration of an image forming system.

As illustrated in FIG. 1, an image forming system 1 of the present embodiment includes a host device 10, a printer control device (digital front end) (hereinafter, referred to as DFE) 30, an interface controller (mechanism I/F controller) (hereinafter, may be referred to as MIC) 40, and a printing device 60. The host device 10, the DFE 30, the MIC 40, and the printing device 60 are mutually connected through a wired or wireless communication line in a data-transferable manner.

The DFE 30 performs communication with the printing device 60 through the MIC 40, and controls formation of an image in the printing device 60. Further, the host device 10 such as a personal computer (PC) is connected to the DFE 30. The DFE 30 receives image data from the host device 10. The DFE 30 then generates, using the image data, image data for the printing device 60 to form a toner image according to CMYK toners and a clear toner. Further, the DFE 30 transmits the generated image data to the printing device 60 through the MIC 40.

In the example of FIG. 1, the printing device 60 is configured from a printer device 50 and a post-processing device 75. In the printer device 50, the CMYK toners and the clear toner are at least mounted, and an image formation unit including a photoconductor, a charging device, a developing device, and a photoconductor cleaner, and an exposure device are mounted for each toner. The printer device 50 emits a light beam from the exposure device to form a toner image on the photoconductor according to the respective toners, and transfers the toner image on a recording medium such as a recording paper, according to the image data transmitted from the DFE 30 through the MIC 40. The transferred toner image is applied heat and pressure at a temperature within a predetermined range (normal temperature) in a fixing device (not illustrated) and fixed on the recording medium. Accordingly, an image is formed on the recording medium.

Here, the clear toner is a transparent (colorless) toner not including a color material. Note that transparent (colorless) indicates that the transmittance is 70% or more.

In the example of FIG. 1, the post-processing device 75 is configured from a glosser 70 connected to the printer device 50, a normal fixing post-processing device 80 connected to the glosser 70, and a low-temperature fixing post-processing device 90 connected to the normal fixing post-processing device 80. However, the post-processing device 75 is not limited thereto, and can employ various known configurations. ON and OFF of the glosser 70 are controlled by the DFE 30, and when the glosser 70 is turned ON, the glosser 70 re-fixes the image formed on the recording medium by the printer device 50. Accordingly, a total adhesion amount of toners of pixels to which a predetermined amount or more of the toners adheres becomes uniformly compressed in the entire image formed on the recording medium.

The clear toner and the fixing device for fixing the clear toner are mounted on the normal fixing post-processing device 80, and clear toner plane image data (image data for forming a toner image according to the clear toner) generated by the DFE 30 is input to the normal fixing post-processing device 80. The normal fixing post-processing device 80 superimposes the toner image by the clear toner on the image pressurized by the glosser 70 and formed on the recording medium, using the input clear toner plane image data. The toner image formed on the recording medium is then applied heat and pressure at a normal temperature in the fixing device and fixed on the recording medium.

The clear toner and the fixing device for fixing the clear toner are mounted on the low-temperature fixing post-processing device 90, and clear toner plane image data generated by the DFE 30 is input to the low-temperature fixing post-processing device 90. The low-temperature fixing post-processing device 90 superimposes the toner image by the clear toner on the image pressurized by the glosser 70 and the normal fixing post-processing device 80 and formed on the recording medium, using the input clear toner plane image data. The toner image formed on the recording medium is then applied heat and pressure at a lower temperature (low temperature) than the normal temperature in the fixing device and fixed on the recording medium.

Here, the image data output from the host device 10 to the DFE 30 will be described.

The host device 10 generates original copy data in which special color plane information (special color plane image data described below) is added to color plane image data according to specification of the user. The special color plane is image data for causing special toners or inks such as white, gold, and silver to adhere, in addition to basic colors such as CMYK, and is data for printers in which such special toners or inks are mounted. As the special color plane, R may be added to the CMYK basic colors or Y may be added to RGB basic colors, in order to improve color reproducibility. Typically, the clear toner has been treated as one of the special colors. In the image forming system 1 of the present embodiment, a transparent developer that is a clear toner as a special color is used in addition to color developers that are toners of the CMYK basic colors. The image forming system 1 of the present embodiment executes a plurality of different types of transparent processing (may sometimes be referred to as clear processing) by using the clear toner. As the clear processing, there are processing of forming a gloss effect (may sometimes be referred to as surface effect) that is visual or tactile effect provided to a paper and processing of forming a transparent image, using the clear toner. As the clear processing, various known technologies can be used.

Figures 2, 3:
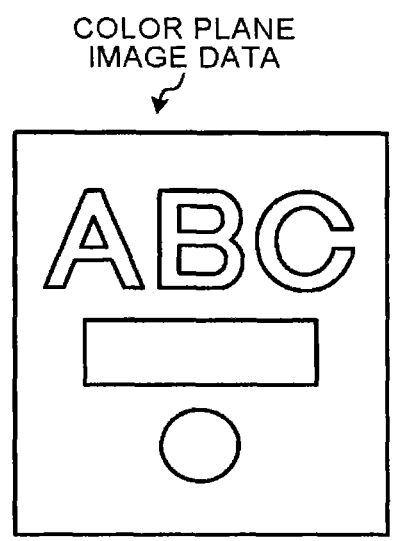
FIG. 2 is a diagram illustrating an example of color plane image data.
FIG. 3 is a diagram exemplarily illustrating types of gloss effects.

The color plane image data is image data that defines an image to be formed with a color developer of a color toner. Specifically, the color plane image data is image data that defines color density values of the RGB, CMYK, or the like, for each drawing area. FIG. 2 is an explanatory diagram illustrating an example of the color plane image data. In FIG. 2, the density value corresponding to a color specified by the user is provided for each drawing area (object) such as "A", "B", or "C". The density value of each drawing area is represented by a density value of 0 to 100%, for example (may be represented by "0" to "255", or the like).

The special color plane image data is data that defines a transparent area to be realized using the clear toner. The special color plane image data includes gloss control plane image data and clear plane image data. These gloss control plane image data and the clear plane image data are generated based on specification of the user. The gloss control plane image data is image data that defines a gloss effect to be provided to a paper. Specifically, the gloss control plane image data is image data that identifies an area to which the gloss effect is provided and a type of the gloss effect, in order to perform adhesion control of the clear toner according to the gloss effect that is visual or tactile effect to be provided to a paper. The clear plane image data is image data that identifies a transparent image of a water mark, texture, or the like other than the above-described gloss effects. Note that, hereinafter, a case of using only the gloss control plane image data as the special color plane image data will be described as an example.

In the gloss control plane image data, the density value of a gloss area (drawing area) that indicates an area to which the clear toner is provided is represented by the density value of 0 to 100% (may be represented by "0" to "255", or the like), similarly to the color plane image data of the RGB, CMYK, or the like, and the type of the gloss effect is associated with the density value.

Here, as the types of the gloss effects, there are roughly one related to presence or absence of gloss, surface protection, a watermark with embedded information, and texture. As for the gloss effect related to the presence or absence of gloss, there are roughly four types, as exemplarily illustrated in FIG. 3, including specular gloss (premium gross (PG)), solid gloss (gross (G)), halftone-dot matt (matt (M)), and matting (premium matt (PM)) in descending order of the degree of gloss (glossiness). Hereinafter, the specular gloss may be referred to as "PG", the solid gloss may be referred to as "G", the halftone-dot matt may be referred to as "M", and the matting may be referred to as "PM".

The specular gloss and the solid gloss have a high degree of providing gloss. In contrast, the halftone-dot matt and the matting suppress gloss, and especially, the matting realizes glossiness lower than that of a normal paper. In the drawing, the specular gloss indicates glossiness Gs of 80 or more, the solid gloss indicates solid glossiness made by a primary color or a secondary color, the halftone-dot matt indicates glossiness of a primary color and halftone-dot of 30%, and the matting indicates glossiness of 10 or less. Further, a deviation of the glossiness is represented by £Gs, and is 10 or less.

For the respective types of the gloss effects, a high density value is associated with the gloss effect having a high degree of providing gloss, and a low density value is associated with the gloss effect that suppresses gloss. The gloss effect of the watermark, texture, or the like is associated with an intermediate density value. As the watermark, a character, a background pattern, or the like is used. The texture expresses a character or a pattern, and can provide a tactile effect, in addition to a visual effect. For example, a stained glass pattern can be realized by the clear toner. The specular gloss or the solid gloss is used as a substitute for the surface protection.

Note that to which object in the color plane image data the gloss effect is provided, and which type of the gloss effect is provided to the object are determined according to specification of the user. The host device 10 sets the density value corresponding to the gloss effect specified by the user to each drawing area that serves as a target to which the gloss effect is provided, thereby to generate gloss control plane image data in a vector format.

Figure 4:
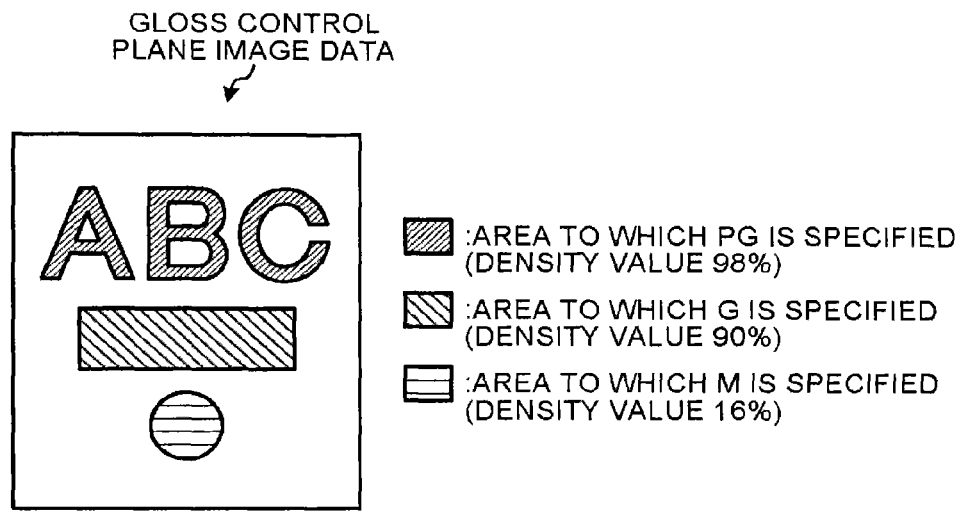
FIG. 4 is a diagram illustrating gloss control plane image data as an image.

FIG. 4 is an explanatory diagram illustrating an example of the gloss control plane image data. The example of the gloss control plane image data of FIG. 4 illustrates that the gloss effect "PG (specular gloss)" is provided to a drawing areas "ABC", the gloss effect "G (solid gloss)" is provided to a drawing area "(rectangular figure)", and the gloss effect "M (halftone-dot matt) is provided to a drawing area "(circular figure)", according to specification of the user.

The color plane image data and the gloss control plane image data are generated in a portable document format (PDF) in page units, and these color plane image data and the gloss control plane image data are integrated and the original copy data is generated. The generated original copy data is then transmitted to the DFE 30. Note that the data format of each plane image data is not limited to the PDF, and an arbitrary format can be used.

Although detailed content will be described below, in the present embodiment, when the user specifies an object to which the user wishes to provide the gloss effect, the user performs an operation for specifying a processing range from which a contour is extracted, of an image represented by the color plane image data (in this example, corresponding to "target image data" in Claims). The host device 10 determines the processing range according to the operation of the user. Then, when the determined processing range includes an object expressed by pixel data (the object may be referred to as "image object" in the description below) and an object expressed by vector data (the object may be referred to as "graphic object" in the description below), the host device 10 rasterizes the mixed image and graphic as one image, and extracts a contour from the image (combined image data) obtained through the rasterization. The host device 10 then determines a drawing area surrounded by the extracted contour as the object to which the gloss effect is provided.

In the host device 10 of the present embodiment, an application (may be referred to as "object specifying application" in the description below) used for specifying an object to which the user wishes to provide the gloss effect is mounted. Hereinafter, functions included in the host device 10 will be described, mainly focusing on the function related to the object specifying application. Note that, in this example, the host device 10 can be considered corresponding to "information processing device" in Claims.

Figure 5:
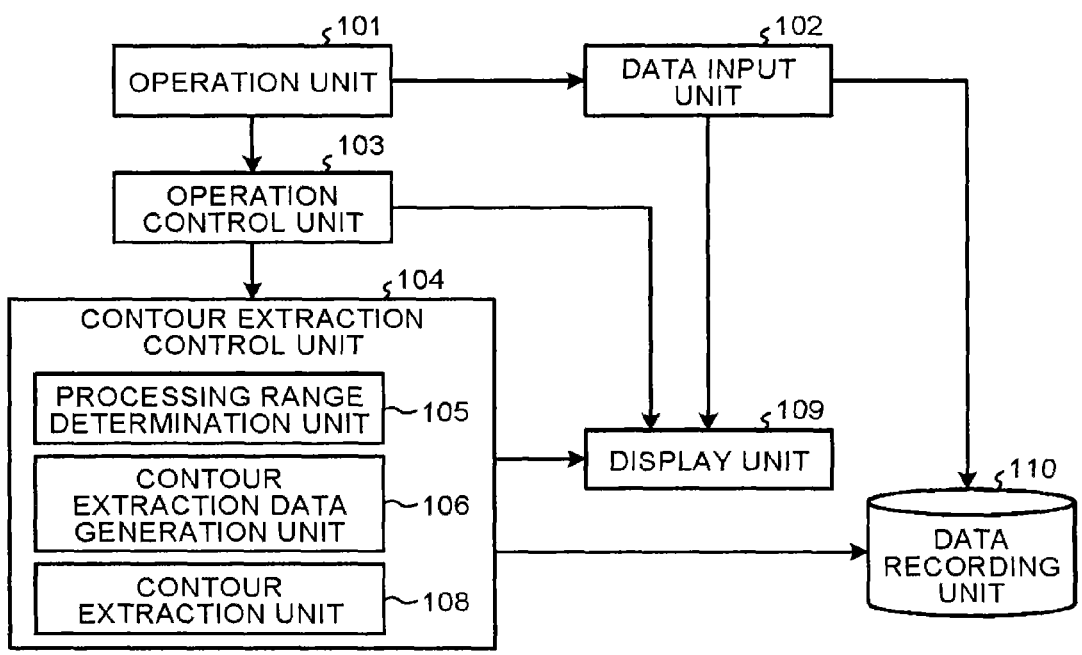
FIG. 5 is a diagram illustrating an example of a functional configuration of a host device of a first embodiment.

FIG. 5 is a block diagram illustrating an example of a functional configuration of the host device 10. As illustrated in FIG. 5, the host device 10 includes an operation unit 101, a data input unit 102, an operation control unit 103, a contour extraction control unit 104, a display unit 109, and a data recording unit 110.

The operation unit 101 is an input device used by the user for inputting various instructions and various types of setting, and can be configured from a keyboard, a mouse, or the like, for example. Hereinafter, a case in which the operation unit 101 is configured from a mouse will be described as an example.

Figure 6:
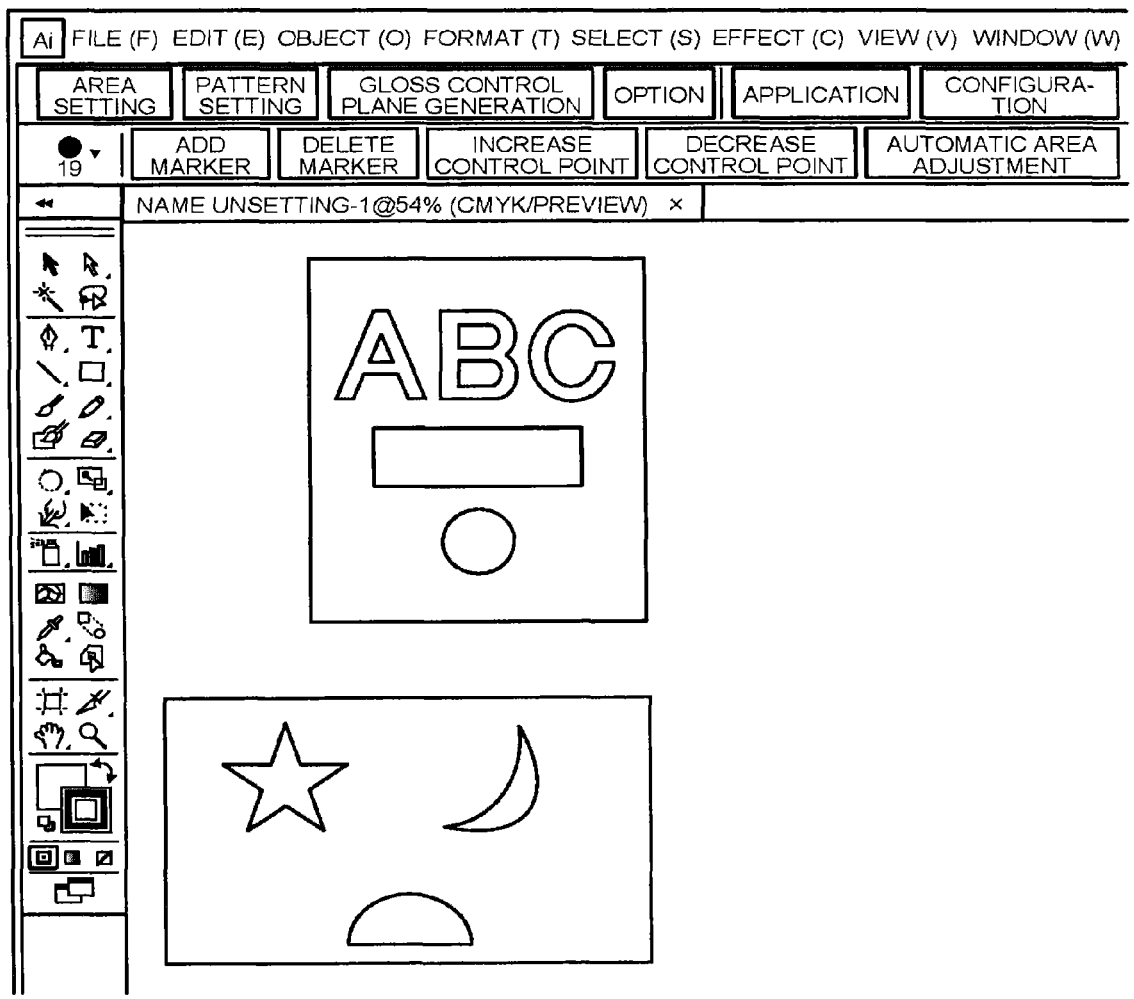
FIG. 6 is a diagram illustrating an example of a screen displayed by an image processing application.

The data input unit 102 reads electronic data (for example, color plane image data stored in a memory (not illustrated)) specified according to an operation of the operation unit 101 from a memory (not illustrated), and records the read electronic data in the data recording unit 110. Further, the data input unit 102 performs control of converting the read electronic data into preview display data in a data format that can be treated in the display unit 109, and displaying the converted data in the display unit 109. In this example, the data input unit 102 displays a screen exemplarily illustrated in FIG. 6 in the display unit 109. FIG. 6 illustrates an example of a screen displayed when a plug-in is incorporated in Illustrator sold by Adobe Systems® Incorporated. The screen illustrated in FIG. 6 displays an image (may be referred to as "target image" in the description below) represented by the color plane image data specified by the user through the operation unit 101.

Figure 7:
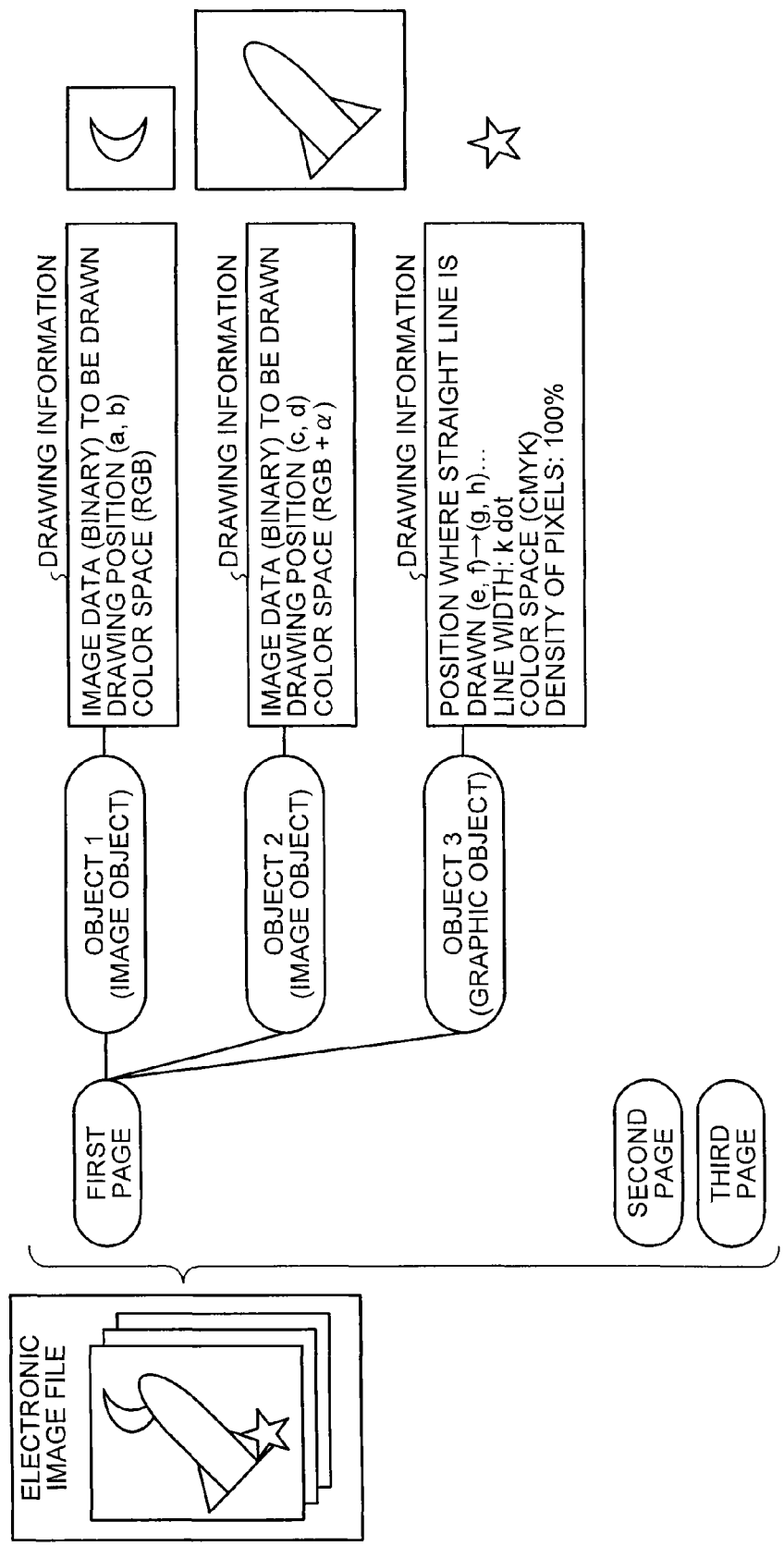
FIG. 7 is a diagram illustrating an example of a configuration of color plane image data.

FIG. 7 is a diagram illustrating an example of a configuration of the color plane image data stored in the data recording unit 110 as electronic data (an electronic image file). The color plane image data includes drawing information of each object included in the same page. For example, the drawing information includes information indicating a position of a drawing area, a color space, and density. In the example of FIG. 7, an object 1 is an image object that indicates an object expressed by pixel data, and includes information indicating a drawing position and an RGB color space as the drawing information. An object 2 is also an image object, and includes information indicating a drawing position and an RGB color space as the drawing information. Further, an object 3 is a graphic object that indicates an object expressed by vector data, and includes information indicating a position where a straight line is drawn, a line width, a CMYK color space, and density of each pixel as the drawing information.

Referring back to FIG. 5, description will be continued. The operation control unit 103 converts an operation received from the operation unit 101 into available event information, and notifies the contour extraction control unit 104 of the converted event information. In this example, the event information can be considered as information that indicates the operation of the user.

Further, the operation control unit 103 can also perform control of displaying various images in the display unit 109 according to a user operation received from the operation unit 101. For example, in FIG. 6, when the user presses a button image (not illustrated) for selecting the object specifying application through the operation unit 101, the operation control unit 103 performs control of displaying a UI image related to the object specifying application in the display unit 109. When the button image for selecting the object specifying application is pressed, the object specifying application is executed (started), and the user performs an operation input through the operation unit 101, thereby to specify an object to which the user wishes to provide the gloss effect. Then, when the user performs an operation to specify the type of the gloss effect that the user wishes to provide, with respect to the specified object, the host device 10 determines the type of the gloss effect to be provided to the object according to the specification of the user, and generates the gloss control plane data.

Referring back to FIG. 5, description will be continued. The contour extraction control unit 104 includes a processing range determination unit 105, a contour extraction data generation unit 106, and a contour extraction unit 108. Further, the contour extraction control unit 104 has a function to receive the event information from the operation control unit 103.

When the event information notified from the operation control unit 103 indicates a user operation that specifies a processing range of contour extraction processing, the processing range determination unit 105 determines the processing range according to the user operation, records information indicating the determined processing range in the data recording unit 110, and then performs control of displaying the information in the display unit 109.

When the event information notified from the operation control unit 103 indicates a user operation that requests the contour extraction processing, the contour extraction data generation unit 106 first acquires the information indicating the processing range from the data recording unit 110. Next, the contour extraction data generation unit 106 acquires the electronic image file (for example, the color plane image data having the configuration exemplarily illustrated in FIG. 7) of the target image from the data recording unit 110, and identifies the image object (corresponding to "first object" in Claims) and the graphic object (corresponding to "second object" in Claims) in the processing range from the acquired electronic image file. In this example, the contour extraction data generation unit 106 can be considered to have a function of an "identifying unit" in Claims.

Next, the contour extraction data generation unit 106 performs rasterization based on first drawing information indicating the drawing information of the identified image object and second drawing information indicating the drawing information of the identified graphic object to generate combined image data, into which the image object and the graphic object are combined, and records the generated combined image data in the data recording unit 110. In this example, the contour extraction data generation unit 106 can be considered to have a function of a "generation unit" in Claims.

Note that, in this example, the contour extraction data generation unit 106 has the function of the "identifying unit" in Claims and the function of the "generation unit" in Claims. However, the configuration is not limited to the example. For example, a configuration in which the function of the "identifying unit" in Claims and the "generation unit" in Claims are separately provided may be employed. When generation of the combined image data has been completed, the contour extraction data generation unit 106 requests the contour extraction unit 108 to perform the contour extraction processing.

The contour extraction unit 108 that has received the request of the contour extraction processing acquires the combined image data from the data recording unit 110, and extracts a contour from the acquired combined image data. As processing for extracting the contour, various known technologies can be used. Then, the contour extraction unit 108 generates and displays a graphic object (may be referred to as "contour object" in the description below) having contour information that indicates the extracted contour.

The display unit 109 is a device that displays various images, and can be configured from a liquid crystal display device, or the like, for example. The data recording unit 110 is a device that records various data, and can be configured from a hard disk drive (HDD) or a recording medium such as a flash memory, for example.

Figure 8:
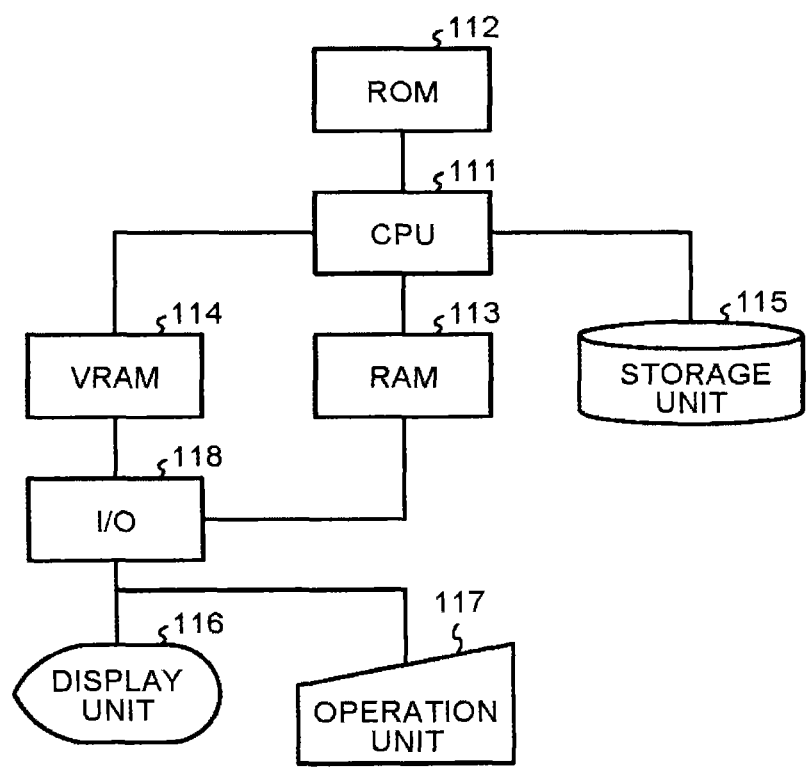
FIG. 8 is a diagram illustrating an example of a hardware configuration of the host device.

FIG. 8 is a diagram illustrating an example of a hardware configuration of the host device 10. As illustrated in FIG. 8, the host device 10 includes a central processing unit (CPU) 111, memories such as a ROM 112, a RAM 113, and a VRAM 114, a storage unit 115 such as an HDD, a display unit 116 such as a display, an operation unit 117 such as a keyboard or a mouse, and an input/output interface I/O 118, and has a hardware configuration using a normal computer.

In the present embodiment, the CPU 111 reads a program stored in the ROM 112, or the like in the RAM 113, and executes the program, thereby to realize functions of the data input unit 102, the operation control unit 103, and the contour extraction control unit 104 (the processing range determination unit 105, the contour extraction data generation unit 106, and the contour extraction unit 108). However, the configuration is not limited thereto, and for example, at least a part of the data input unit 102, the operation control unit 103, and the contour extraction control unit 104 may be realized by a dedicated hardware circuit (for example, a semiconductor integrated circuit, or the like). Further, in this example, the operation unit 101 is realized by the operation unit 117, and the display unit 109 is realized by the display unit 116. Further, the data recording unit 110 can be realized by the storage unit 115, or the like.

Note that the program executed by the CPU 111 may be provided by being recorded in a computer-readable recording medium such as a CD-ROM, a flexible disk (FD), a CD-R, or a digital versatile disk (DVD) with a file in an installable format or an executable format.

Further, the program executed by the CPU 111 may be stored on a computer connected to a network such as the Internet, and may be provided by being downloaded through the network. Further, the control program executed by the CPU 111 may be distributed or provided through the network such as the Internet.

Figure 9:
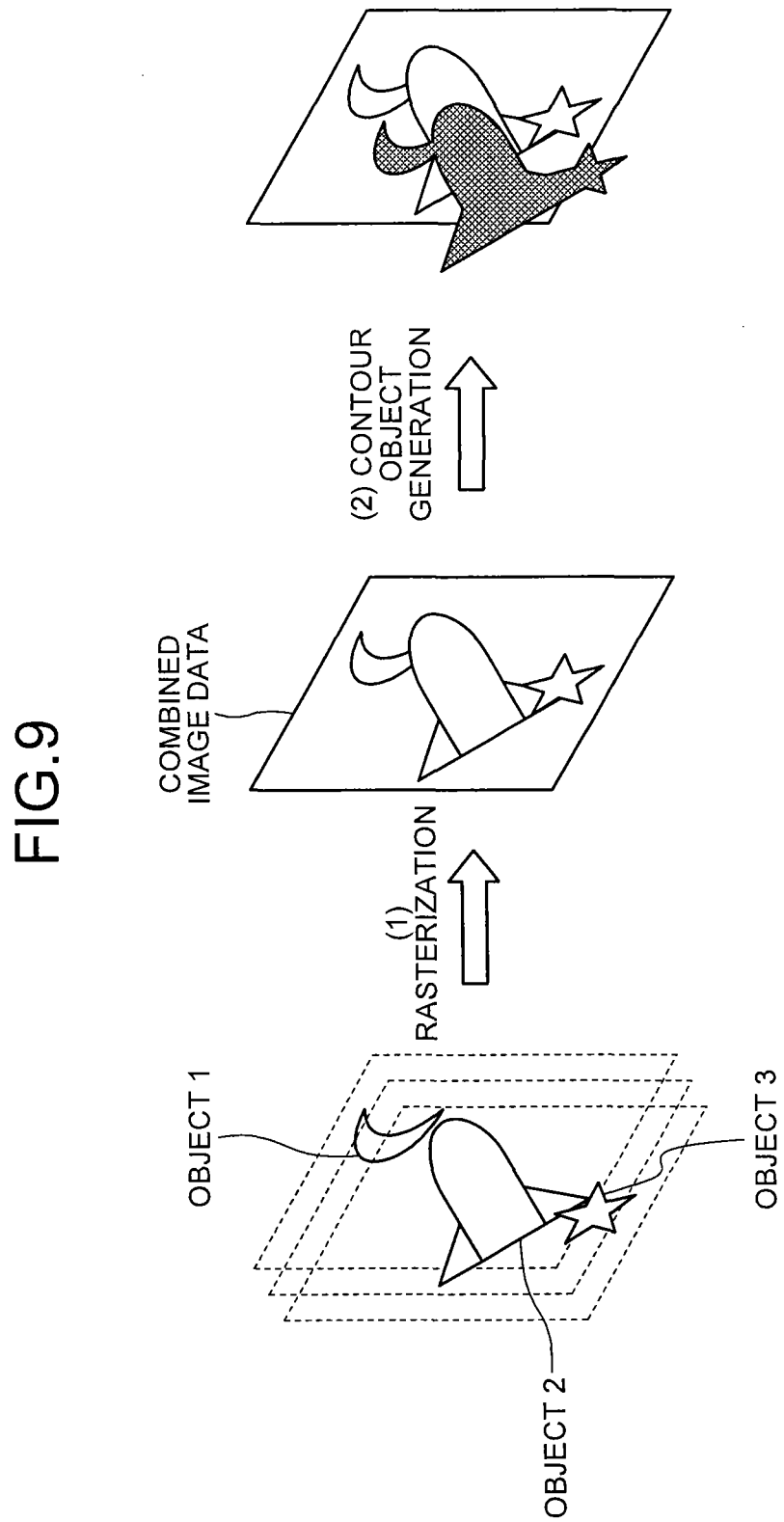
FIG. 9 is a conceptual diagram illustrating a state in which a contour object is generated by a method of the first embodiment.

FIG. 9 is a conceptual diagram illustrating a state in which the contour object is generated by a method of the present embodiment. The example of FIG. 9 assumes a case in which the entire target image is specified as the processing range. Further, assume that a data structure of the color plane image data that is the target image data is the data structure exemplarily illustrated in FIG. 7. As illustrated in FIG. 9, rasterization based on the drawing information of the objects 1 and 2 that are the image objects within the processing range and the drawing information of the object 3 that is the graphic object is performed, and combined image data is generated. Next, a contour is extracted from the combined image data, and a graphic object having contour information that indicates the extracted contour is generated as the contour object.

The host device 10 sets a color space and a density value of the contour object expressed by vector data according to the type of the gloss effect specified by the user. In this way, the host device 10 generates gloss control plane image data. The host device 10 then integrates the generated gloss control plane image data and the color plane image data exemplarily illustrated in FIG. 7 to generate original copy data.

Figure 10:
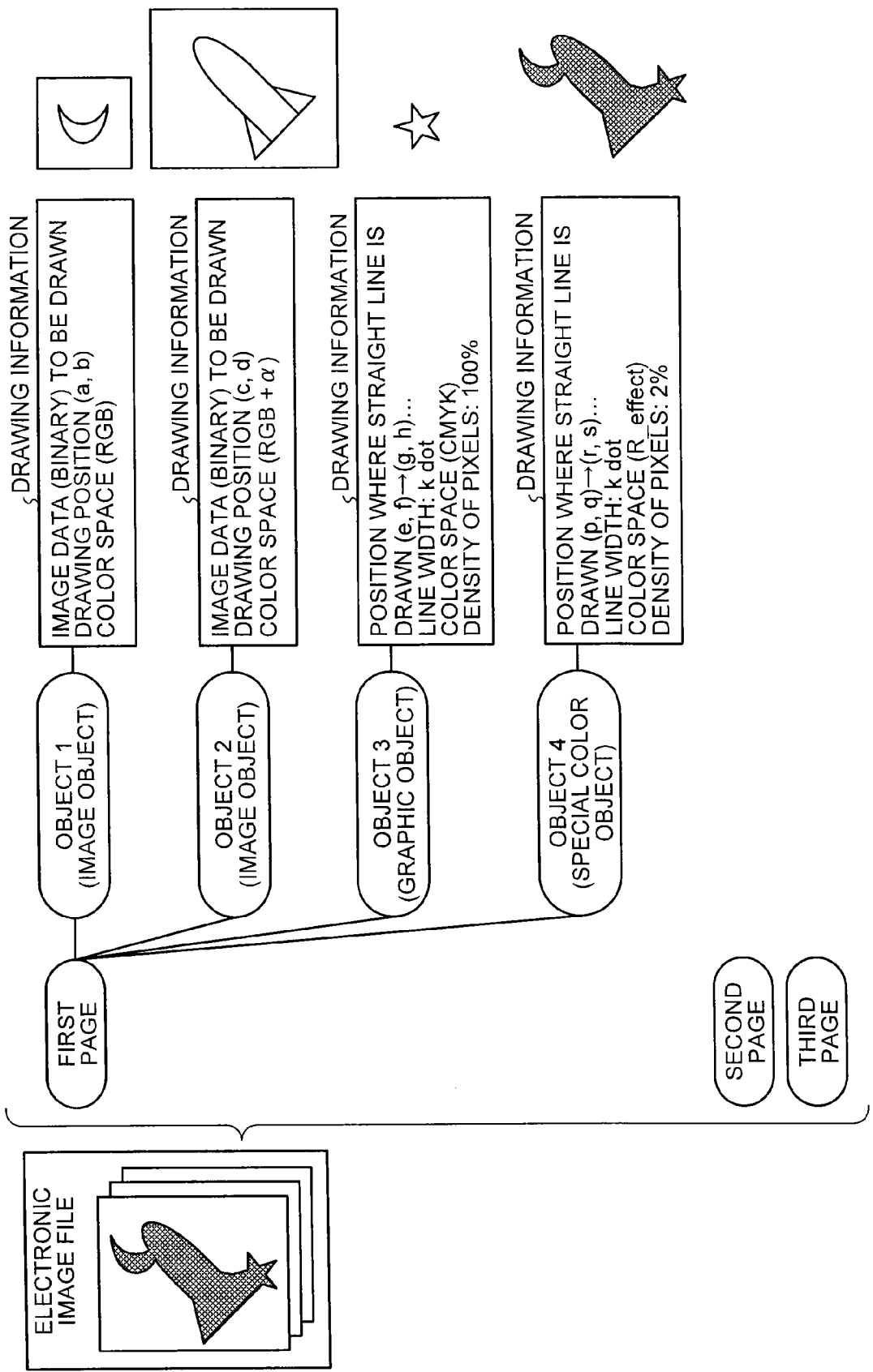
FIG. 10 is a diagram illustrating an example of a configuration of original copy data.

A configuration of the original copy data in this case is illustrated in FIG. 10. The original copy data includes the drawing information of each object included in the same page. Each object is identified by the color plane image data and the gloss control plane image data. The objects 1 to 3 are similar to the content exemplarily illustrated in FIG. 7. A newly added object 4 represents an object (special color object) in which the color space of the contour object is set to a color space of R-effect that represents a gloss area to which the gloss effect is provided and the density value of the contour object is set to a density value corresponding to the type of the gloss effect specified by the user. The drawing information of the object 4 includes information that indicates a position where a straight line is drawn, a line width, the color space of R-effect, and density of pixels. Note that, in the object 4, R-effect is defined as a color plane. However, this color plane cannot be expressed by the CMYK at the time of printing. Typically, when printing is performed using a toner (for example, a red toner) other than the CMYK toners, red is defined as the color plane in the electronic image file. The same applied to the clear toner, in the electronic image file, the color space of an output of a location where the clear toner is used uses special definition, instead of the CMYK.

Figure 11:
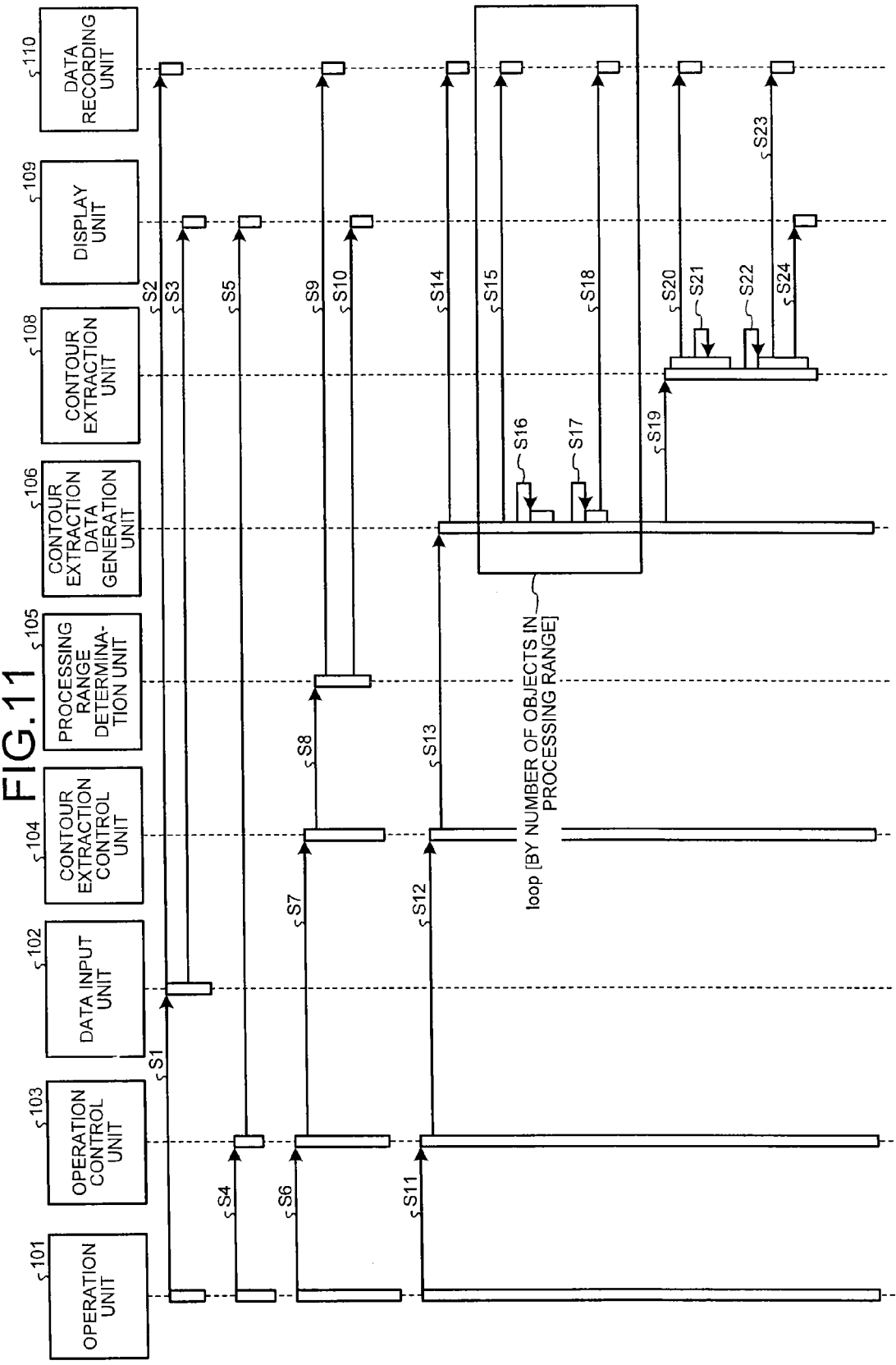
FIG. 11 is a diagram illustrating an example of a procedure to generate a contour object by the host device of the first embodiment.

FIG. 11 is a diagram illustrating an example of a procedure to generate the contour object by the host device 10. First, when having received an operation that specifies the color plane image data stored in a memory (not illustrated) through the operation unit 101 (step S1), the data input unit 102 reads the specified color plane image data from the memory (not illustrated), and records the electronic image file that indicates the read color plane image data in the data recording unit 110 (step S2). Further, the data input unit 102 performs control of converting the read color plane image data into preview display data in a data format that can be treated in the display unit 109, and displaying the converted data in the display unit 109 (step S3).

Next, when having received an operation that presses a button image for selecting the object specifying application through the operation unit 101 (step S4), the operation control unit 103 performs control of displaying the UI image related to the object specifying application in the display unit 109 (step S5). At this time, the object specifying application is started (executed).

Next, when having received an operation that specifies the processing range through the operation unit 101 (step S6), the operation control unit 103 notifies the contour extraction control unit 104 of the event information indicating the operation that specifies the processing range (step S7). The contour extraction control unit 104 that has received the event information requests the processing range determination unit 105 to perform the processing of determining the processing range (step S8). The processing range determination unit 105 that has received the request determines the processing range according to the user operation indicated by the event information, records information that indicates the determined processing range in the data recording unit 110 (step S9), and then performs control of displaying the information in the display unit 109 (step S10). In this example, when having received the event information indicating the operation that specifies the processing range, the processing range determination unit 105 determines the entire image represented by the color plane image data as the processing range. However, the procedure is not limited thereto.

Next, when having received the operation that requests (instructs) the contour extraction processing through the operation unit 101 (step S11), the operation control unit 103 notifies the contour extraction control unit 104 of the event information indicating the operation that requests the contour extraction processing (step S12). The contour extraction control unit 104 that has received the event information requests the contour extraction data generation unit 106 to perform the processing of generating a contour object (step S13). The contour extraction data generation unit 106 that has received the request acquires the information indicating the processing range from the data recording unit 110 (step S14). Next, the contour extraction data generation unit 106 acquires the electronic image file indicating the color plane image data specified by the user from the data recording unit 110 (step S15), and identifies the image object and the graphic object within the processing range from the acquired electronic image file (step S16). Next, the contour extraction data generation unit 106 performs rasterization based on the first drawing information that indicates the drawing information of the identified image object and the second drawing information that indicates the drawing information of the identified graphic object to generate combined image data, into which the image object and the graphic object are combined (step S17), and records the generated combined image data in the data recording unit 110 (step S18). Next, the contour extraction data generation unit 106 requests the contour extraction unit 108 to perform the contour extraction processing (step S19).

The contour extraction unit 108 that has received the request of the contour extraction processing acquires the combined image data from the data recording unit 110 (step S20), and extracts a contour from the acquired combined image data (step S21). Next, the contour extraction unit 108 generates a graphic object (contour object) that has contour information indicating the extracted contour (step S22), records the generated contour object in the data recording unit 110 (step S23), and then performs control of displaying the contour object in the display unit 109 (step S24).

Figure 12:
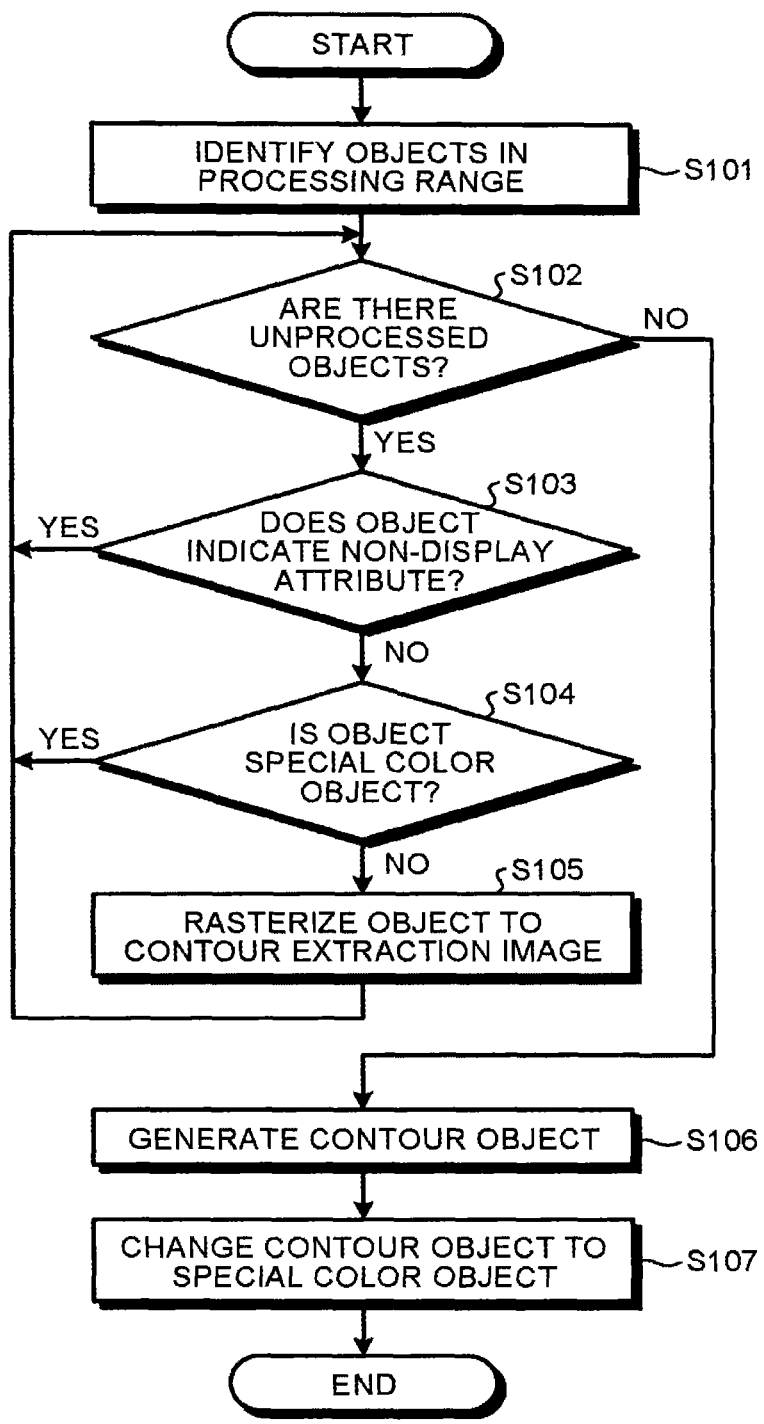
FIG. 12 is a flowchart illustrating an operation example of the host device of the first embodiment.

FIG. 12 is a flowchart illustrating an operation example of the host device 10 of when having received the operation that requests the contour extraction processing (an operation example of the host device 10 of step S15 and subsequent steps illustrated in FIG. 11). First, the contour extraction data generation unit 106 identifies objects within the processing range from the electronic image file (in this example, the color plane image data including the drawing information of each object) of the target image acquired from the data recording unit 110 (step S101).

Next, the contour extraction data generation unit 106 confirms whether there are unprocessed objects in the objects identified in step S101 (step S102). When there are unprocessed objects (Yes in step S102), the contour extraction data generation unit 106 selects one of the unprocessed objects, and confirms whether the selected object is an object that indicates a non-display attribute (step S103). When having determined that the selected object is not the object that indicates a non-display attribute (No in step S103), the contour extraction data generation unit 106 confirms whether the selected object is a special color object that indicates the drawing area to which the clear toner is provided (step S104). In this example, the color plane image data that is the target image data does not include the special color object, and thus a result of step S104 is denied, and the processing is moved onto next step S105. In short, while the contour extraction data generation unit 106 identifies the image object and the graphic object within the processing range, the contour extraction data generation unit 106 does not identify the object that indicates a non-display attribute and the special color object. Note that, when the result of step S103 is affirmed, or when the result of step S104 is affirmed, the processing of step S102 and subsequent steps is repeated.

In step S105, the contour extraction data generation unit 106 rasterizes the selected object to a contour extraction image. Then, the processing of step S102 and subsequent steps is repeated, and the combined image data, into which the image object and the graphic object are combined, is generated. When having determined in step S102 that there is no unprocessed object (No in step S102), the contour extraction data generation unit 106 records the generated combined image data in the data recording unit 110, and requests the contour extraction unit 108 to perform the contour extraction processing. The contour extraction unit 108 that has received the request of the contour extraction processing acquires the combined image data from the data recording unit 110, and extracts a contour from the acquired combined image data. Then, the contour extraction unit 108 performs control of generating a graphic object (contour object) having contour information that indicates the extracted contour (step S106), and displaying the graphic object in the display unit 109. When the user has performed an operation that specifies a type of the gloss effect that the user wishes to provide, the host device 10 sets the color space of the contour object to the color space of R-effect that expresses the gloss area to which the gloss effect is provided, and sets the density value of the contour object to the density value corresponding to the type of the gloss effect specified by the user, thereby to change the contour object to the special color object (step S107).

As described above, in the present embodiment, when the image object and the graphic object are included in the processing range that indicates a range of the contour extraction processing, a contour is extracted from an image (combined image data) obtained by rasterization of the mixed image and graphic. Accordingly, an advantageous effect to extract a contour from an image in which an image object and a graphic object are mixed can be achieved.

Second Embodiment

Next, a second embodiment will be described. A host device of the second embodiment (hereinafter, may be referred to as "host device 100") determines a processing range according to an operation of a user, then, when an image object and a graphic object are included in the determined processing range, rasterizes only the image object, and extracts a contour from the image obtained through the rasterization. Hereinafter, description will be specifically given. Note that description of a portion overlapped with the first embodiment is appropriately omitted.

Figure 13:
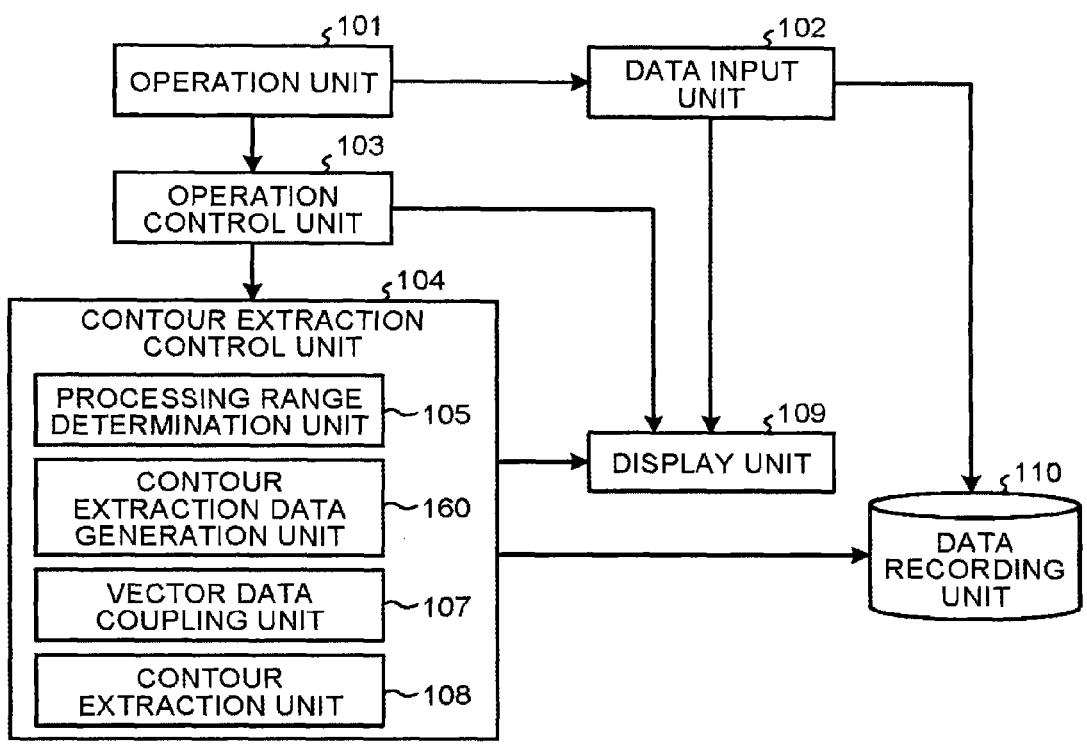
FIG. 13 is a diagram illustrating an example of a functional configuration of a host device of a second embodiment.

FIG. 13 is a block diagram illustrating an example of a functional configuration of the host device 100 of the second embodiment. The host device 100, as illustrated in FIG. 13, is different from the first embodiment in including a contour extraction data generation unit 160 having a different function from the first embodiment and a vector data coupling unit 107.

The contour extraction data generation unit 160 has a function to identify an image object and a graphic object in the processing range, similarly to the first embodiment. Further, the contour extraction data generation unit 160 has a function to perform rasterization based on first drawing information indicating drawing information of the identified image object to generate contour extraction image data.

When a contour object expressed by vector data that can identify a contour extracted by a contour extraction unit 108 and the graphic object (second object) in the processing range are overlapped, the vector data coupling unit 107 has a function to combine the contour object and the graphic object.

Figure 14:
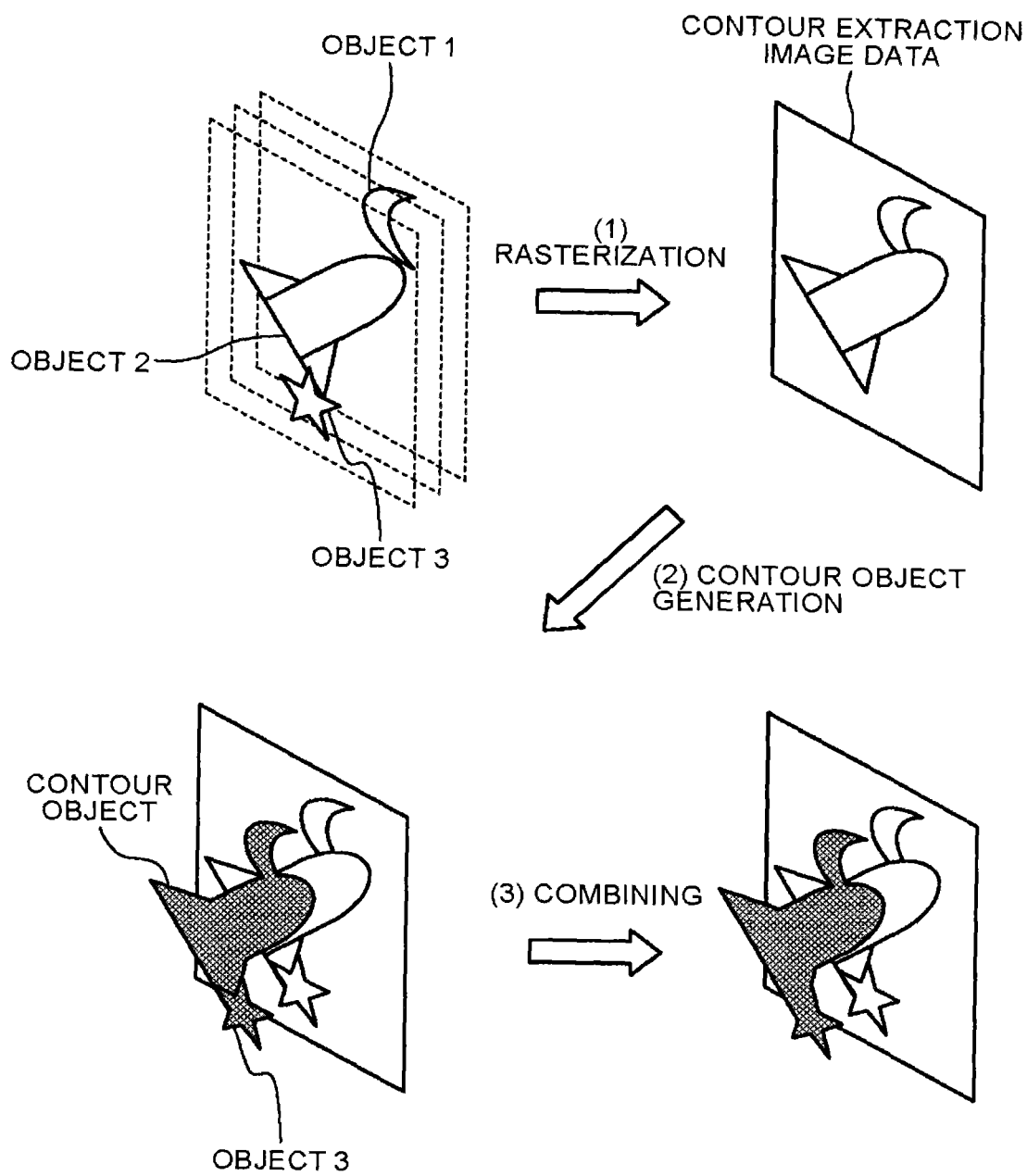
FIG. 14 is a conceptual diagram illustrating a state in which a contour object is generated by a method of the second embodiment.

FIG. 14 is a conceptual diagram illustrating a state in which the contour object is generated by a method of the present embodiment. The example of FIG. 14 assumes a case in which the entire target image is specified as the processing range, similarly to FIG. 9. Further, assume that a data structure of color plane image data that is target image data is the data structure exemplarily illustrated in FIG. 7. As illustrated in FIG. 14, rasterization based on drawing information of objects 1 and 2 that are image objects in the processing range is performed, and contour extraction image data is generated. Next, a contour is extracted from the contour extraction image data, and a graphic object having contour information that indicates the extracted contour is generated as a contour object. Further, the graphic object in the processing range is copied. When the contour object and the graphic object in the processing range are overlapped, the contour object and the graphic object in the processing range are combined. In the description below, a graphic object obtained by the combining may be referred to as "combined contour object". Then, the host device 100 sets a color space and a density value of the combined contour object expressed by the vector data according to a type of a gloss effect specified by the user, thereby to change the combined contour object to a special color object.

Figure 15:
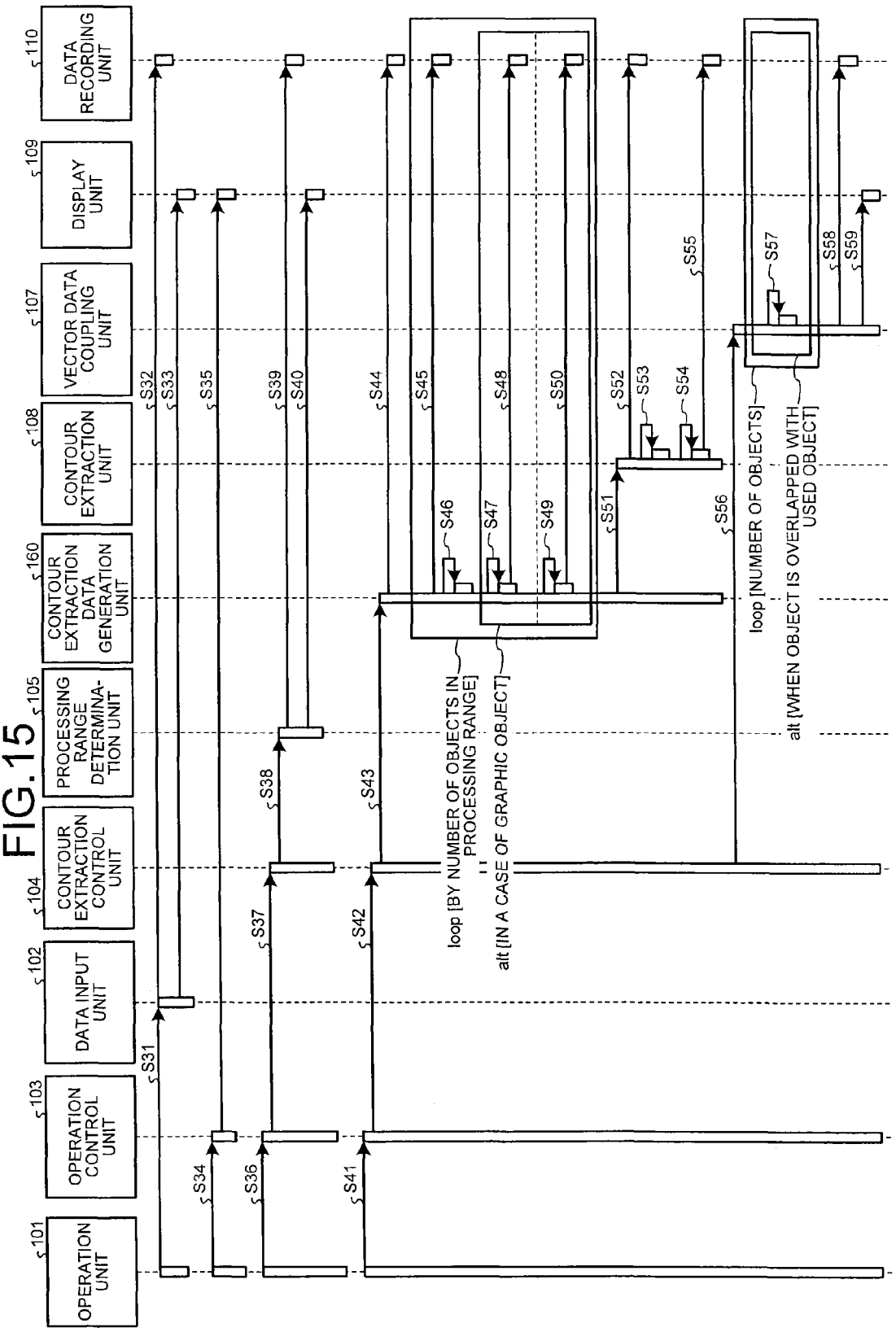
FIG. 15 is a diagram illustrating an example of a procedure to generate a combined contour object by the host device of the second embodiment.

FIG. 15 is a diagram illustrating an example of a procedure to generate the combined contour object by the host device 100. Content of steps S31 to S44 illustrated in FIG. 15 is similar to that of steps S1 to S14 illustrated in FIG. 11, and thus detailed description is omitted here. In step S44 illustrated in FIG. 15, after acquiring information indicating the processing range from a data recording unit 110, the contour extraction data generation unit 160 acquires an electronic image file of color plane image data specified by the user from the data recording unit 110 (step S45), and identifies an image object and a graphic object in the processing range from the acquired electronic image file (step S46).

Next, the contour extraction data generation unit 160 copies (duplicates) the graphic in the processing range (step S47), and records the copied graphic object in the data recording unit 110 (step S48). Further, as for the image object in the processing range, the contour extraction data generation unit 160 performs rasterization based on drawing information of the image object to generate contour extraction image data (step S49), and records the generated contour extraction image data in the data recording unit 110 (step S50). When the processing of steps of S47 to S50 has been completed with respect to all of the image objects and the graphic objects in the processing range (excluding an object that indicates a non-display attribute and a special color object, similarly to the first embodiment), the contour extraction data generation unit 160 requests the contour extraction unit 108 to perform contour extraction processing (step S51).

The contour extraction unit 108 that has received the request of the contour extraction processing acquires the contour extraction image data from the data recording unit 110 (step S52), and extracts a contour from the acquired contour extraction image data (step S53). Next, the contour extraction unit 108 generates a graphic object (contour object) having contour information that indicates the extracted contour (step S54), and records the generated contour object in the data recording unit 110 (step S55). The contour extraction data generation unit 160 returns the copied graphic object and a graphic object group of the contour objects (may be referred to as "contour object list" in the description below) to a contour extraction control unit 104, as a result to the request of step S43 (the execution request of processing to generate a contour object). Next, the contour extraction control unit 104 specifies the contour object list received as a result to the request of step S43, as arguments, and requests the vector data coupling unit 107 to perform combining processing of graphic objects (step S56).

When the graphic objects specified as the arguments are overlapped, the vector data coupling unit 107 that has received the request combines these graphic objects (step S57). The vector data coupling unit 107 records the combined graphic object (combined contour object) in the data recording unit 110 (step S58), and then performs control of displaying the combined graphic object in a display unit 109 (step S59).

Figure 16:
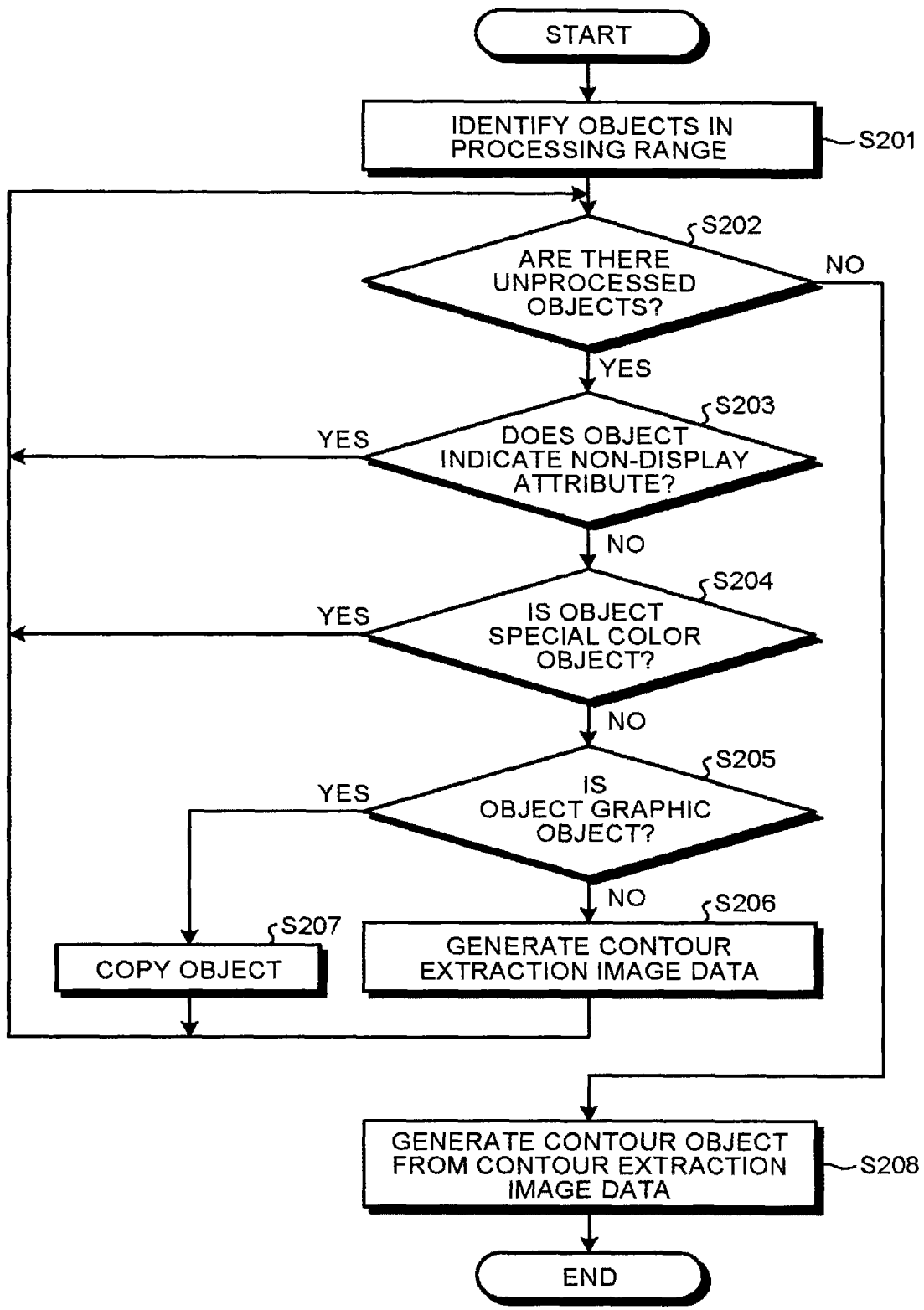
FIG. 16 is a flowchart illustrating an operation example of the host device of the second embodiment.

FIG. 16 is a flowchart illustrating an operation example of the host device 100 of steps S45 to S55 illustrated in FIG. 15. Processing content of steps S201 to S204 illustrated in FIG. 16 is similar to the processing content of steps S101 to S104 illustrated in FIG. 12, and thus detailed description is omitted here. When an object selected from unprocessed objects is not an object that indicates a non-display attribute (No in step S203), and is not a special color object (No in step S204), the contour extraction data generation unit 160 confirms whether the selected object is a graphic object (step S205). When having determined that the selected object is not a graphic object but is an image object (No in step S205), the contour extraction data generation unit 160 performs rasterization based on the drawing information of the image object to generate contour extraction image data (step S206), and records the generated contour extraction image data in the data recording unit 110. Meanwhile, when having determined that the selected object is a graphic object (Yes in step S205), the contour extraction data generation unit 160 copies the graphic object (step S207), and records the copied graphic object in the data recording unit 110. The contour extraction data generation unit 160 repeats the processing of step S202 and subsequent steps.

In step S202, when having determined that there is no unprocessed object (No in step S202), the contour extraction data generation unit 160 requests the contour extraction unit 108 to perform the contour extraction processing. The contour extraction unit 108 that has received the request of the contour extraction processing acquires the contour extraction image data from the data recording unit 110, and extracts a contour from the acquired contour extraction image data. The contour extraction unit 108 then generates a graphic object (contour object) having contour information that indicates the extracted contour (step S208), and records the generated contour object in the data recording unit 110.

The contour extraction control unit 104 that has received the graphic object copied in step S207 and the graphic object group ("contour object list") of the contour objects generated in step S208 as a processing result requests the vector data coupling unit 107 to perform combining processing of the graphic objects.

Figure 17:
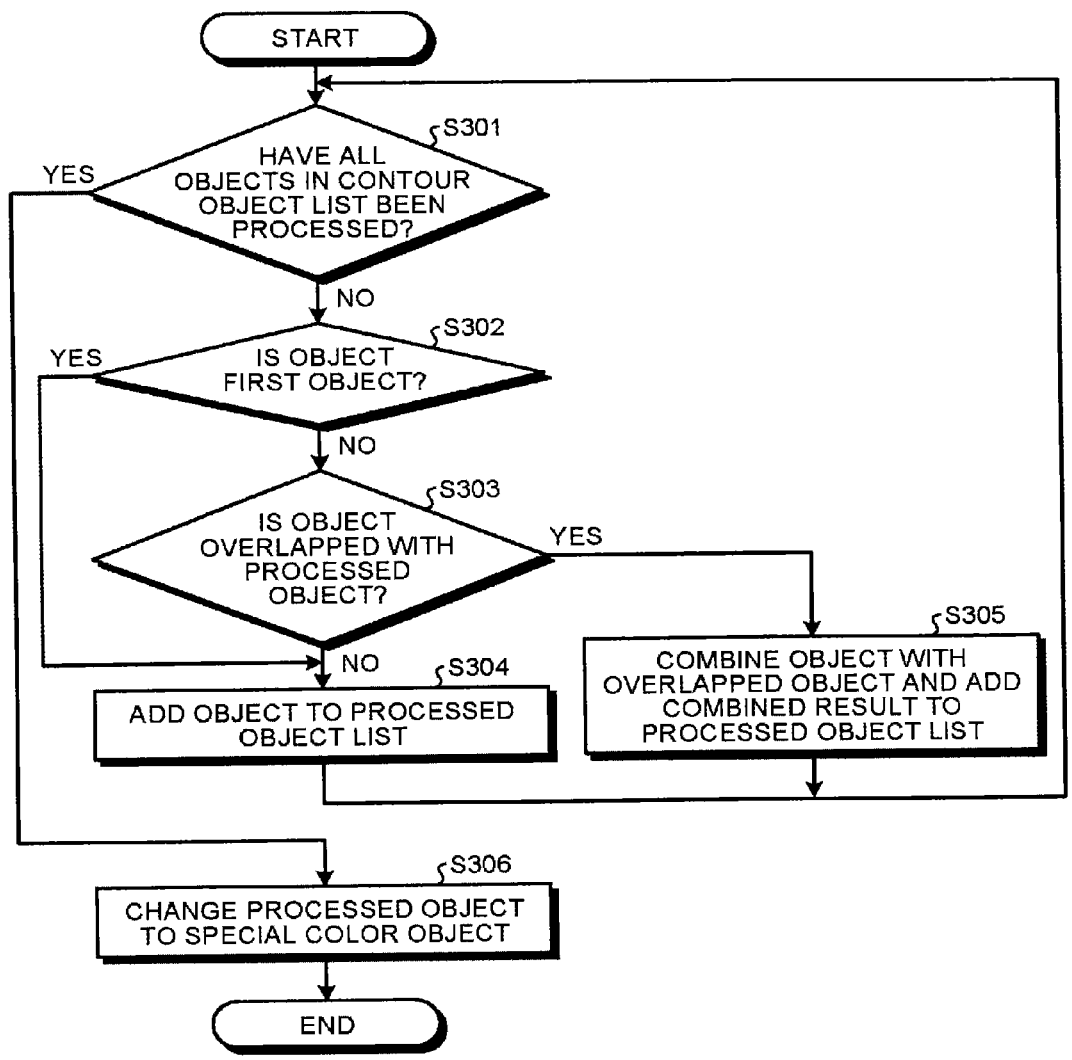
FIG. 17 is a flowchart illustrating an operation example of the host device of the second embodiment.

FIG. 17 is a flowchart illustrating an operation example of the host device 100 of step S56 and subsequent steps illustrated in FIG. 15. When having received the request of the combining processing from the contour extraction control unit 104, the vector data coupling unit 107 confirms whether having processed all of the objects (graphic objects) in the contour object list (step S301). When there are unprocessed objects (No in step S301), the vector data coupling unit 107 selects one of the unprocessed objects, and confirms whether the selected object is the first object (step S302). When the selected object is the first object (Yes in step S302), the vector data coupling unit 107 adds the selected object to the processed object list (step S304), and repeats the processing of step S301 and subsequent steps.

Meanwhile, in step S302, when the selected object is not the first object (No in step S302), the vector data coupling unit 107 confirms whether the selected object is overlapped with any of the processed objects (step S303). When the selected object is overlapped with any of the processed objects (Yes in step S303), the vector data coupling unit 107 combines the selected object and the object overlapped with the selected object, of the processed objects, and adds the combined object (combined contour object) to the processed object list (step S305). Then, the vector data coupling unit 107 repeats the processing of step S301 and subsequent steps. Further, in step S303, when the selected object is not overlapped with any of the processed objects (No in step S303), the vector data coupling unit 107 adds the selected object to the processed object list (step S304), and repeats the processing of step S301 and subsequent steps.

In step S301, when there is no unprocessed object (Yes in step S301), the vector data coupling unit 107 records the processed objects (including the combined contour object) in the data recording unit 110, and then performs control of displaying the processed objects in the display unit 109. Then, when the user performs an operation to specify a type of a gloss effect that the user wishes to provide to areas corresponding to the processed objects, the host device 100 sets color spaces and density values of the processed objects according to the type of the gloss effect specified by the user, thereby to change the processed objects to special color objects (step S306).

As described above, in the present embodiment, when the image object and the graphic object are included in the processing range that indicates a range of the contour extraction processing, the graphic object including contour information is not rasterized, and only the image object is rasterized, and the contour is extracted from the contour extraction image data obtained through the rasterization. Further, when the contour object having contour information that indicates the contour extracted from the contour extraction image data and the graphic object in the processing range are overlapped, the combined contour object, into which the contour object and the graphic object are combined, is generated. Accordingly, an advantageous effect to extract a contour from an image in which an image object and a graphic object are mixed can be achieved.

Note that, in the above embodiments, the configuration to generate the original copy data in which the information of the special color plane (special color plane image data) is added to the color plane image data has been described as an example. However, a configuration to which the present invention can be applied is not limited to the configuration, and for example, may be a configuration in which the special color plane image data is not generated.

Hereinafter, modifications will be described.

(1) First Modification

A method of determining the above-described processing range is arbitrary. For example, a configuration may be employed, in which, when a user operates a mouse while confirming an image represented by color plane image data (target image data) displayed in a display unit 109, and performs work of surrounding a predetermined area of the image, the predetermined area may be determined as the processing range. Further, the function provided by the above-described object specifying application may include a function to improve efficiency of the work.

For example, a host device 10 (100) can further include a receiving unit that receives specified position information that indicates a position specified by the user with respect to an image (target image) represented by target image data, and when a distance between a start point position that indicates a start point of a position indicated by the specified position information sequentially received in the receiving unit, and a position indicated by the latest specified position information is a threshold or less, a processing range determination unit 105 can determine a closed area obtained based on a history of the received specified position information, as the processing range. For example, the user operates a mouse while confirming the target image displayed in the display unit 109, moves a mouse cursor that indicates a current position of a mouse input, adjusts the mouse cursor to an arbitrary position on the target image, and performs a click operation, thereby to specify the arbitrary position. Event information in this case may be information including operation information that identifies the click operation of the mouse and the specified position information that indicates the position specified by the user with respect to the target image. In this case, the click operation of the mouse corresponds to an operation to specify the processing range.

Figure 18:
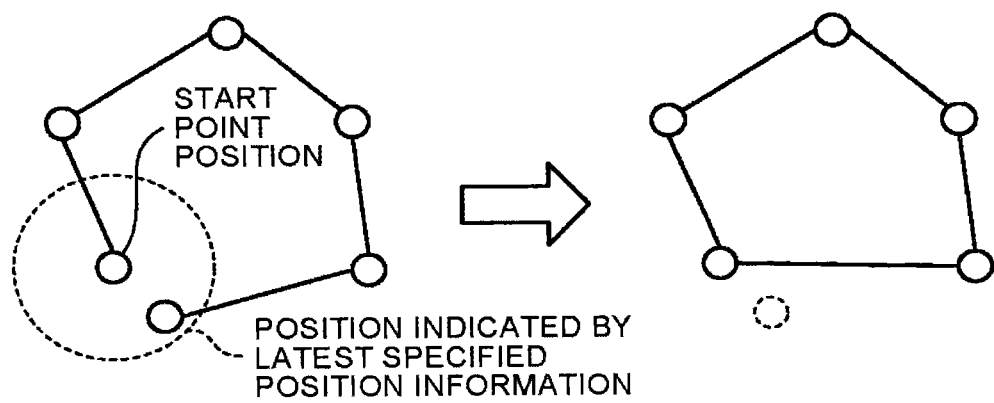
FIG. 18 is a diagram for describing a complementary function of when a processing range is determined.

Further, for example, when the distance between the start point position and the position indicated by the latest specified position information is a threshold or less, the processing range determination unit 105 replaces the position indicated by the latest specified position information with the start point position, and then can determine (decide) a closed area obtained by linking the start point position to positions indicated by the specified position information received until receiving the latest specified position information one by one, as the processing range. Accordingly, as illustrated in FIG. 18, even when the start point position and the position indicated by the latest specified position information are not exactly matched, the position indicated by the latest specified position information is replaced with the start point position (in a different point of view, the start point position is regarded as an end point position), and the closed area obtained by linking sequentially the positions indicated by the specified position information received so far, using the start point position as the start point and the end point, is determined as the processing range.

(2) Second Modification

In the above embodiments, the case in which the target image data that is a target of the contour extraction processing is the color plane image data has been described as an example. However, the target image data is not limited to above example. For example, the target image data may be original copy data, into which color plane image data and gloss control plane image data (special color plane image data) are combined.

Note that the above modifications can be arbitrarily combined. Further, the embodiments and the modifications can be arbitrarily combined.

According to the present invention, a contour can be extracted from an image in which an object expressed by pixel data and an object expressed by vector data are mixed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
    an identifying unit configured to identify a first object expressed by pixel data and a second object expressed by vector data from target image data including drawing information for each object;
    a generation unit configured to perform rasterization based on first drawing information indicating the drawing information of the first object and second drawing information indicating the drawing information of the second object to generate combined image data, into which the first object and the second object are combined; and
    a contour extraction unit configured to extract a contour from the combined image data.

2. The information processing device according to claim 1, wherein the identifying unit does not identify an object indicating a non-display attribute.

3. The information processing device according to claim 1, wherein the identifying unit does not identify a special color object indicating a drawing area to which a special color is provided.

4. The information processing device according to claim 1, further comprising:
    a processing range determination unit configured to determine a processing range indicating a range to extract a contour, of an image represented by the target image data, wherein
    the identifying unit identifies the first object and the second object in the processing range.

5. The information processing device according to claim 4, further comprising:
    a receiving unit configured to receive specified position information indicating a position specified by a user with respect to the image represented by the target image data, wherein
    the processing range determination unit determines, when a distance between a start point position indicating a start point of a position indicated by the specified position information sequentially received in the receiving unit and a position indicated by latest specified position information is a threshold or less, a closed area obtainable based on a history of the received specified position information, as the processing range.

6. An image processing device comprising:
    an identifying unit configured to identify a first object expressed by pixel data and a second object expressed by vector data from target image data including drawing information for each object;
    a generation unit configured to perform rasterization based on first drawing information indicating the drawing information of the first object to generate contour extraction image data; and
    a contour extraction unit configured to extract a contour from the contour extraction image data.

7. The information processing device according to claim 6, further comprising:
a combining unit configured to combine, when a contour object expressed by vector data capable of identifying the contour extracted by the contour extraction unit and the second object are overlapped, the contour object and the second object.

8. The information processing device according to claim 6, wherein the identifying unit does not identify an object indicating a non-display attribute.

9. The information processing device according to claim 6, wherein the identifying unit does not identify a special color object indicating a drawing area to which a special color is provided.

10. The information processing device according to claim 6, further comprising:
a processing range determination unit configured to determine a processing range indicating a range to extract a contour, of an image represented by the target image data, wherein
the identifying unit identifies the first object and the second object in the processing range.

11. The information processing device according to claim 10, further comprising:
a receiving unit configured to receive specified position information indicating a position specified by a user with respect to the image represented by the target image data, wherein
the processing range determination unit determines, when a distance between a start point position indicating a start point of a position indicated by the specified position information sequentially received in the receiving unit and a position indicated by latest specified position information is a threshold or less, a closed area obtainable based on a history of the received specified position information, as the processing range.

12. A method of processing information, the method comprising the steps of:
identifying a first object expressed by pixel data and a second object expressed by vector data from target image data including drawing information for each object;
performing rasterization based on first drawing information indicating the drawing information of the first object and second drawing information indicating the drawing information of the second object to generate combined image data, into which the first object and the second object are combined; and
extracting a contour from the combined image data.

* * * * *